United States Patent [19]

Bourrain et al.

[11] 4,148,963
[45] Apr. 10, 1979

[54] ADHESIVE-COATING COMPOSITION FOR ORGANIC OR MINERAL FILAMENTS

[75] Inventors: Paul Bourrain, Ecully; Pierre Giroud, La Verpillere, both of France

[73] Assignee: Rhone-Poulenc-Textile, Paris, France

[21] Appl. No.: 821,171

[22] Filed: Aug. 2, 1977

[30] Foreign Application Priority Data

Aug. 4, 1976 [FR] France .............................. 76 24022
Jun. 22, 1977 [FR] France .............................. 77 19357
Jun. 27, 1977 [FR] France .............................. 77 19713

[51] Int. Cl.$^2$ ............................................. C08L 61/12
[52] U.S. Cl. ..................................... 428/392; 156/333; 156/334; 156/335; 260/29.3; 428/393; 428/394; 428/395
[58] Field of Search ....................... 260/29.3, 844, 847; 156/334, 335, 333; 428/392, 393, 394, 395

[56] References Cited

U.S. PATENT DOCUMENTS

| | | | |
|---|---|---|---|
| 3,424,608 | 1/1969 | Marzocchi et al. | 260/29.3 |
| 3,533,830 | 10/1970 | Marzocchi et al. | 260/29.3 |
| 3,843,484 | 10/1974 | Kamiyoshi et al. | 260/29.3 |
| 4,016,325 | 4/1977 | Flautt et al. | 428/268 |

*Primary Examiner*—Theodore E. Pertilla
*Attorney, Agent, or Firm*—Stevens, Davis, Miller & Mosher

[57] ABSTRACT

The present invention relates to an adhesive-coating composition for increasing the adhesion of heat-stable, high-modulus, modal, polyester-based yarns and glass fibres towards compounded rubbers based on natural rubber and on synthetic rubber, said composition comprising a solution of a precondensed resorcinol/formaldehyde resin, a latex based on vinylpyridine and polychloroprene latex, 28% strength ammonium hydroxide and a dicarboxylated butadiene/styrene resin. Yarns and fibres coated with the adhesive-coating composition of the invention are useful in the manufacture of tires, conveyors, conveyor belts, hoses and the like.

2 Claims, No Drawings

ADHESIVE-COATING COMPOSITION FOR ORGANIC OR MINERAL FILAMENTS

The present invention relates to a new adhesive-coating composition which is very easy to use and makes it possible to increase the adhesion of continuous yarns based on polyester, heat-stable, high-modulus polymers, "modal" yarn and glass fibres intended for the reinforcement of articles made of compounded rubber based on natural rubber and on synthetic rubber.

In the text, the term "yarns" denotes: continuous filaments and assemblies formed when such filaments are assembled in one and the same operation, yarns and cords formed by twisting, doubling or interlacing a certain number of these filaments, and the woven and non-woven fabrics which are formed from such filaments, yarns or cords, discontinuous fibres and spun yarns consisting of the said discontinuous fibres, and woven and nonwoven fabrics formed from such discontinuous or spun fibres, and combinations of continuous and discontinuous fibres in the form of yarns, cords or fabrics.

By "compounded rubbers based on natural rubber" there are understood compounded rubbers containing from 40 to 100% of natural rubber, in which the other constituents can be, for example, synthetic polyisoprene, polybutadiene or a butadiene/styrene copolymer and the like.

By "compounded rubbers based on synthetic rubber" there are understood those consisting, for example, of polychloroprene, polyisoprene, polybutadiene, butadiene/styrene copolymers and the like.

It is also possible to use mixtures of two types of compounded rubbers in varying percentages depending on the use to be made of them and depending on their compatibility.

From French Application No. 2,182,993 there are already known compositions for treating glass fibres, which compositions comprise an aqueous system having a solids content of 2 to 10 parts by weight of resorcinol/aldehyde resin, 20 to 60 parts by weight of a butadiene/styrene/vinylpyridine terpolymer, 20 to 30 parts by weight of a dicarboxylated butadiene/styrene resin and 4 to 20 parts by weight of an incompatible wax.

However, such a composition does not make it possible to obtain adhesive-coated glass fibres having sufficient flexibility for the fibres to be used for the production of articles of great flexibility.

U.S. Pat. No. 3,533,830 proposes adhesive-coating baths for glass fibres which contain, in addition to the resorcinol/formaldehyde resin, a vinylpyridine/butadiene/styrene terpolymer, a polychloroprene latex, a butadiene/styrene latex and carbon black.

U.S. Pat. No. 3,876,024 proposes the use of adhesive-coating compositions containing a polymer produced by grafting vinyl chloride, vinylidene chloride or chloroprene on a vinylpyridine/butadiene/styrene terpolymer, and a microcrystalline paraffin wax.

However, the adhesive-coating compositions of these two U.S. patents do not make it possible to obtain adhesive-coated yarns which are sufficiently flexible for the uses in the rubber industry and which possess the necessary "tack" for easy handling.

The present invention relates to a new adhesive-coating composition which makes it possible to increase the adhesion of heat-stable yarns "high-modulus" yarns, yarns based on polyesters, yarns of the modal type, as well as glass fibres, towards compounded rubbers based on natural rubber and synthetic rubber, which composition consists of:

| | |
|---|---|
| a resin solution A containing: | |
| softened water | 547 to 8,954 parts by weight |
| sodium hydroxide | 1 to 2 parts by weight |
| precondensed resorcinol/formaldehyde resin | 48 to 57 parts by weight |
| 40% strength formaldehyde | 14.75 to 17.5 parts by weight |
| a latex solution B containing: | |
| latex based on vinylpyridine | 805 to 875 parts by weight |
| polychloroprene latex | 46 to 92 parts by weight |
| 28% strength ammonium hydroxide | 80 parts by weight |
| a latex solution C containing: | |
| softened water | 200 parts by weight |
| 28% strength ammonium hydroxide | 15 parts by weight |
| dicarboxylated butadiene styrene resin | 350 parts by weight | in which the proportion by weight of solids relative to the weight of the bath varies between 6 and 30%, the proportion by weight of dry resin relative to the total weight of solids varies from 8% to 10%, the ratio of dry latex to the weight of dry resin varies from 8/1 to 11/1, the proportion by weight of dry chlorinated latex relative to the total weight of dry latex varies from 5 to 10%, the proportion by weight of dry latex relative to the total amount of solids varies from 86 to 87% and the final pH is 9.6±0.3.

The present invention also relates to the yarns which have been adhesive-coated by means of the above composition.

By yarns based on "polyester" there are understood yarns based on polyesters and copolyesters produced from at least one aromatic diacid or one of its esters and, optionally, a small amount of an aliphatic diacid, and at least one aliphatic, or cycloalkane possessing 2 to 10 carbon atoms in the molecule. Preferably, the aromatic diacid is terephthalic acid, the aliphatic diacid is adipic acid or sebacic acid and the diol is ethylene glycol, 1,4-butane diol or 1,4-cyclohexanedimethanol.

The yarns of the "modal" type are those defined by "BISFA", the international bureau for the standardisation of rayon and synthetic fibres.

By "high modulus" there is to be understood here a modulus of elasticity or Young's modulus greater, on average, than 250 g/1.1 dtex (1 denier), this modulus being measured in accordance with Standard specification ASTM D 2IOI, part 25, 1968.

The invention is more particularly applicable to the high modulus yarns which furthermore have a high tenacity and/or a high breaking energy, that is to say of at least 50 g/tex, and preferably of at least 100 g/tex. The high modulus yarns are obtained by spinning polymers of inorganic origin such as boron or of organic origin, or are obtained by carbonisation or graphitisation of filaments of polymers based on acrylonitrile; as filaments of organic origin there may be mentioned those produced from polymers which generally contain aromatic nuclei to which rigid radicals are fixed. As an example of these polymers there may be mentioned the aromatic polyamides and more particularly those having a parastructure, of the type of poly-para-phenylene terephthalamide or poly-para-benzamide, the arylaliphatic polyamides or copolyamides of the poly-hexamethylene terephthalamide type or copolyamides which contain aromatic diacids or aliphatic saturated, unsaturated and/or cyclic diacids and aromatic or aliphatic diamines, the copolyamides derived more particularly from terephthalic acid, adipic acid and tetramethylene diamines or para-phenylene diamines, such as those described in French Application No. 2,272,118, published on Dec. 19, 1975, the polyoxadiazoles such as polyarylene-1,3,4-oxadiazole, the copolyoxadiazoles produced from mixtures of isophthalic and terephthalic acids or one of these and aliphatic or cycloalkane acids, and the PVA-based polymers having a high tenacity and high modulus.

The invention is also applicable to industrial yarns of the heat-stable type, that is to say yarns which have a high heat resistance (350°–500° C.) and which are based on polymers either of the polyamide-imide type produced by the reaction of a diamine or of one of its derivatives with an acid anhydride or one of its derivatives, or of the aromatic polyamide type obtained by reaction of an aromatic diacid or of one of its derivatives with a diamine or one of its derivatives, it being possible for these polymers to be modified by the introduction of acid groups.

Finally, the expression "glass fibres" frequently used throughout the present application comprises all the yarns, fibres and filaments, as defined above, formed by rapid thinning-down of streams of molten glass, in a manner known to those skilled in the art, as well as all the articles obtained from these yarns.

By a latex base of vinylpyridine there is understood a styrene/butadiene/vinylpyridine terpolymer known under the trade mark "GEN-TAC" (GENERAL TIRE & RUBBER CO) or UGITEX V.P. (RHONE-POULENC).

The precondensed resorcinol/formaldehyde resin used is preferably the resin known under the trade mark "PENACOLITE $B_1A$" and the dicarboxylated butadiene/styrene resin used is preferably the resin known under the trade mark "PLIOLITE 4121" of Messrs. GOODYEAR TIRE & RUBBER CO.

The resin solution A is prepared by introducing the starting products, in the stated order, whilst stirring at ambient temperature. This solution undergoes a ripening process for a few minutes, whilst stirring, at ambient temperature.

The latex solutions B and C are separately prepared in an identical manner, whilst stirring and at ambient temperature.

The latex solution C is poured, whilst stirring at ambient temperature, into the latex solution B, and the resin solution A is then poured into the mixture of the latex solutions B and C whilst stirring at ambient temperature.

The adhesive-coating composition according to the present invention is preferably left standing for about 24 hours so as to give, after the subsequent treatments, adhesive-coated yarns which have optimum mechanical and physical characteristics.

The final pH of the said compositions is generally 9.6±0.3.

The adhesive-coating bath thus obtained has a viscosity which is stable over a period of time, and also has good mechanical stability when the filaments are passed over draining rollers; this means that no coagulation of the adhesive-coating bath takes place on the draining devices.

It is possible to vary the proportion by weight of dry resorcinol/formaldehyde resin relative to the total amount of all the solids contained in the bath; this ratio varies between 8% and 10%.

The proportion of dry latex relative to the total amount of solids can vary between 86% and 87% and the dry latex/dry resin ratio between 8 and 11/1.

Equally, the proportion of the amount of dry latex based on polychloroprene relative to the total amount of dry latex can vary between 5 and 10%.

The ratio of total solids to the weight of the bath can vary from 6 to 30%.

The adhesive-coating treatment by means of the composition according to the present invention is carried out on each of the various types of yarns described above, which have in general been sized and coated with an adhesive primer beforehand in accordance with any process known to those skilled in the art.

After passing through the adhesive-coating bath, which is kept at ambient temperature, the yarns are drained to render the layer of coating uniform and are dried at a temperature which depends on the speed of forward travel of the yarn (but at least 100° C.), using any appropriate device such as an oven and the like, after which they are again heat-treated at a high temperature, generally above 130° C., in order to cross-link the resin.

The cords treated in this way are generally wound up or doubled directly after the cross-linking treatment.

The adhesive-coating compositions according to the present invention have properties which are very valuable to the user. They make it possible to obtain yarns having great flexibility and good adhesion (BISFA static adhesion-test H), whilst the tensometric properties (breaking load, tenacity and elongation at break) remain unchanged.

The yarns adhesive-coated in this way possess both good "tack" and good "slip". The "tack" is the property which the adhesive-coated yarns possess of sticking slightly to one another and to the unvulcanised compounded rubber used, which, inter alia, permits easy winding up and unwinding, as well as good hold of the yarn on the bobbins, by keeping the turns contiguous in a given layer and causing them to stick to one another from one layer to the next.

At the same time, the adhesive-coated yarns possess good "slip", that is to say they are also not subject to drag on passing over working devices in the course of being processed.

Furthermore, it is well known to those skilled in the art that in order to achieve a good level of adhesion between the adhesive-coated yarns, regardless of their nature and of the compounded rubber used, the same elastomer or elastomers must be present both in the adhesive-coating bath formulation and in the compounded rubber used. Surprisingly, it has been found, according to the present invention, that it is possible to obtain acceptable levels of adhesion by introducing latex based on polychloroprene into adhesive-coating baths used to impregnate yarns intended to reinforce both compounded rubbers based on natural rubber and based on synthetic rubber as defined above, but also to achieve flexibility and tack of the adhesive-coated yarns by virtue of the carefully chosen ratios of the various constituents.

The adhesive-coated yarns thus obtained are of great value for all applications in the rubber industry and in particular for the manufacture of cords for tyres, conveyor belts, conveyors, hoses and the like.

The examples which follow, in which the parts are to be understood as being by weight, are given by way of indication but without implying a limitation, in order to illustrate the invention.

In these examples, the adhesive-coating tests are carried out in the manner described below, firstly on compounded rubber based on natural rubber and secondly on compounded rubber based on synthetic rubber.

Adhesion test or test H

This evaluates the adhesion of the adhesive-coated cords to the rubber. The two ends of the cord to be examined are embedded in two blocks of natural rubber which is then vulcanised. The sample is in the shape of a H.

A sample of compounded rubber based on natural rubber, of the following composition by weight, is vulcanised at 145° C. for 30 minutes:

| | |
|---|---|
| smoked sheets | 100 parts by weight |
| EPC carbon black | 43 parts by weight |
| zinc oxide | 5 parts by weight |
| stearic acid | 2 parts by weight |
| pine tar | 2 parts by weight |
| antioxidant MC (phenyl-$\beta$-naphthylamine) | 1 parts by weight |
| "201 RP" rapid accelerator (dibenzothiazyl disulphide) | 1 parts by weight |
| sulphur | 3 parts by weight |

The compounded rubber thus prepared has the following characteristics:

| | |
|---|---|
| tenacity in kg/cm$^2$ | 220 |
| elongation at break, % | 554 |
| modulus at 300% in kg/cm$^2$ | 76 |
| Shore hardness | 61 | and after being left at rest for 24 hours, the adhesion H is determined.

The adhesion test H is also carried out on compounded rubber based on synthetic rubber, in the following manner:

A sample of compounded rubber of the following composition is vulcanised at 153° C. for 30 minutes:

| | |
|---|---|
| chloroprene (trade mark Neoprene G N A) | 100 parts by weight |
| SRF carbon black | 30 parts by weight |
| FT carbon black | 20 parts by weight |
| treated chalk | 10 parts by weight |
| plasticiser known under the trade mark "Circolight Oil" | 15 parts by weight |
| anti-ozone agent known under the trade mark "Heliozone" | 2 parts by weight |
| zinc oxide | 5 parts by weight |
| magnesia | 4 parts by weight |
| antioxidant known under the trade mark "Permanax 49 HV" | 2 parts by weight |
| the product has the following characteristics: | |
| breaking load | 135 kg |
| elongation at break | 592 % |
| modulus at 300 % | 35.75 kg/cm$^2$ |
| Shore hardness | 60 |

EXAMPLE 1

A yarn based on poly(ethylene glycol terephthalate) having a gauge of 1,100 dtex/200 strands is sized, then twisted at 500 turns/meter in the Z-direction and then doubled at 500 turns/meter in the S-direction (1100/1/2 500 Z/S). It is adhesive-coated, for comparison purposes, on the one hand with a comparison bath and on the other hand with a bath according to the present invention.

1A. Experiment with the bath according to the invention

| | | |
|---|---|---|
| softened water | 956.5 | parts by weight |
| sodium hydroxide | 1 | parts by weight |
| precondensed resorcinol/formaldehyde resin known under the trade mark "Penacolite B$_1$A" | 57 | parts by weight |
| 40 % strength formaldehyde | 15.5 | parts by weight |
| whilst stirring and at ambient temperature to give solution A. | | |

A latex solution B, which is left to ripen for 3 to 4 minutes, and a latex solution C, are prepared separately, whilst stirring and at ambient temperature; these solutions respectively contain:

| | |
|---|---|
| latex solution B: | |
| latex based on vinylpyridine | 805 parts by weight |
| polychloroprene | 92 parts by weight |
| 28 % strength ammonium hydroxide | 80 parts by weight |
| latex solution C: | |
| softened water | 200 parts by weight |
| 28 % strength ammonium hydroxide | 15 parts by weight |
| "Pliolite 4121" dicarboxylated butadiene/styrene resin | 350 parts by weight |

Latex solution C is poured into solution B whilst stirring, and solution A is then poured into the mixture thus obtained, whilst stirring at ambient temperature.

| | |
|---|---|
| Solids content of the composition | 25 % |
| Dry weight of resin/solids content | 9.8 % |
| Dry weight of latex/solids content | 86 % |
| Dry weight of latex/dry weight of resin | 8.7/1 |
| Dry weight of chlorinated latex/total of the latices | 10 % |

The bath is left to stand for 24 hours.

The adhesive-coating composition thus obtained, of pH 9.6, has a stable viscosity and good mechanical stability.

The yarns are adhesive-coated at a speed of 18 m/minute and drained on rollers to remove the excess bath, dried continuously in an oven at a temperature of 145° C. and then heat-treated at a temperature of 225° C. to cross-link the resin, during which treatment the yarn is stretched by an amount of about 5% of its initial length and is then relaxed by about 2%.

Amount of deposit on the yarn: 6.5%

$$\left( \frac{\text{adhesive-coated product} - \text{raw roduct}}{\text{raw product}} \right)$$

The adhesion results are shown in the table below.

1B. Comparative experiment with a comparison bath of the following composition:

| | |
|---|---|
| Solution A | |
| resorcinol | 27 parts by weight |
| water | 305 parts by weight |
| The resorcinol is dissolved in water and the following are then added: | |
| NaOH (28 % strength) | 2.5 parts by weight |
| followed by formaldehyde (30% strength) | 48.5 parts by weight |

Solution A is left to ripen for 6 hours at 15° C. and the following is added: NaOH (28% strength) 6 parts by weight

| Solution B | | |
|---|---|---|
| styrene/butadiene/vinylpyridine copolymer latex | 361 | parts by weight |
| natural latex | 68.5 | parts by weight |
| styrene/butadiene latex (S.B.R.) 40% strength | 51.5 | parts by weight |
| water | 130 | parts by weight |

Solution A is poured into Solution B.

The adhesive-coating solution thus prepared has the following characteristics:

| | |
|---|---|
| solids content | 25 % |
| molar ratio formaldehyde/resorcinol | 2 |
| proportion by weight of dry resin/solids content | 16.6% |
| proportion by weight of latex/solids content | 82.5% |
| weight ratio latex/resin | 5/1 |

The yarns are then treated with this bath in the same way as they were treated with the bath according to the invention in experiment 1A.

| | Adhesion results | |
|---|---|---|
| | Test 1 B | Test 1 A |
| Adhesion to synthetic rubber (compounded rubber defined above) | 8.4 kg/5 mm | 9 kg/5 mm |
| Coefficient of variation | conventional base: 100 | 75 |
| Adhesion to natural rubber (compounded rubber defined above) | 9 kg/5 mm | 10.1 kg/5 mm |
| Coefficient of variation | conventional base: 100 | 80 |

EXAMPLE 2

A yarn based on poly(para-phenylene terephthalamide), having a gauge of 1,650 dtex/1,000 strands (gauge per strand 1.65 dtex) is sized, then twisted at 340 turns/meter in the Z-direction and then doubled at 340 turns/meter in the S-direction to give the final construction 1650/1/2 340 Z/S, and is treated with a preadhering agent.

It is then adhesion-coated, by way of comparison, with a comparison bath and a bath according to the present invention.

2A. Experiment with the bath according to the invention identical to that prepared in Example 1, Experiment 1A.

The yarn is then drained on rollers to remove the excess bath, dried continuously to a temperature of 225° C. and then heat-treated at a temperature of 225° C. to cross-link the resin during which treatment the yarn is stretched by 0.36% of its initial length.

Proportion of deposit: 9.5%

The adhesion results are given in the table below.

2B. Comparative experiment with comparison bath

| Solution A | |
|---|---|
| resorcinol | 27 parts by weight |

| Solution A -continued | |
|---|---|
| water | 305 parts by weight |

The resorcinol is dissolved in water and the following are then added:

| | |
|---|---|
| NaOH (28% strength) | 2.5 parts by weight |
| followed by formaldehyde (30 % strength) | 48.5 parts by weight |

Solution A is left to ripen for 6 hours at 15° C. and the following is added:
NaOH (28% strength): 6 parts by weight

| Solution B | | |
|---|---|---|
| styrene/butadiene/vinylpyridine copolymer latex | 361 | parts by weight |
| natural latex | 68.5 | parts by weight |
| styrene/butadiene latex (S.B.R.) 40% strength | 51.5 | parts by weight |
| water | 130 | parts by weight |

Solution A is then poured into solution B.

The adhesion-coating composition thus prepared has the following characteristics:

| | |
|---|---|
| solids content | 25 % |
| molar ratio formaldehyde/resorcinol | 2 |
| proportion by weight of dry resin/solids content | 16.6% |
| proportion by weight of latex/solids content | 82.5% |
| weight ratio latex/resin | 5/1 |

The yarn is treated with this bath in the same manner as in the above experiment 2A according to the invention.

Proportion of deposit on the yarn: 9.5%

| | Adhesion results | |
|---|---|---|
| | Experiment 2 B | Experiment 2 A |
| Adhesion to synthetic rubber Coefficient of variation | 8 kg/5 mm conventional base: 100 | 11 kg/5 mm 80 |
| Adhesion to natural rubber Coefficient of variation | 8 kg/5 mm conventional base: 100 | 8.8 kg/5 mm 60 |

EXAMPLE 3

A yarn of the modal type known commercially by the name of "continuous polynosic yarn BX", having a gauge of 1,400 dtx/3,125 strands (gauge per strand 0.45 dtex) is sized, then twisted at 200 turns/m in the Z-direction and then doubled at 150 turns/m in the S-direction, so as to give the final construction of 1400/1/3 200/150 Z/S. It is adhesive-coated, by way of comparison, with a comparison bath and the bath according to the invention.

3A. Experiment with the bath according to the invention

The bath as described in Example 1A, but having a solids content of 7.5%, the other ratios being identical, is used.

The yarn is adhesive-coated at a speed of 40 m/minute, then drained on rollers to remove the excess bath, dried continuously at a temperature of 185° C. and heat-treated in an oven at 135° C. to cross-link the resin, and is then wound up directly.

Proportion of deposit on the yarn: 4%.

The adhesion results are given in the table below.

3B. Comparative experiment with a bath of the following composition:

| Solution A | | |
|---|---|---|
| water | 93.9 | parts by weight |
| NaOH (28 % strength) | 0.18 | parts by weight |
| formaldehyde | 2.2 | parts by weight |
| precondensed resorcinol/formaldehyde resin ("Miplacol 730" from Kleber Colombes) | 2.2 | parts by weight |

Solution A is prepared by introducing the resin into the water containing the sodium hydroxide and then adding the formaldehyde.

| Latex solution B | | |
|---|---|---|
| polychloroprene latex ("Neoprene 650" of Du Pont) | 27.7 | parts by weight |
| natural latex | 11.9 | parts by weight |
| water | 227.9 | parts by weight |
| Characteristics of the bath: | | |
| solids content | 7.5% | |
| proportion by weight of dry resin/solids content | 11.6 % | |
| proportion by weight of latex/solids content | 88 % | |
| latex/resin ratio | 7.6/1 | |
| proportion by weight of chlorinated latex/ total latex | 70 % | |

Solution A is poured into solution B at 20° C.

This yarn is then treated with the same manner as according to Experiment 3A.

Proportion of deposit on the yarn: 4%.

| Adhesion results | | |
|---|---|---|
| | Experiment 3 B | Experiment 3 A |
| Adhesion to synthetic rubber Coefficient of variation | 6.8 kg/5 mm conventional base: 100 | 8 kg/5 mm 30 |
| Adhesion to natural rubber Coefficient of variation | 7.5 kg/5 mm conventional base: 100 | 7.5 kg/5 mm 100 |

In the above examples, the comparison between the comparison bath and the bath of the invention shows a marked improvement of the adhesion and in the majority of cases better uniformity of the adhesion levels (shown by the values of the coefficient of variation), this being true for different types of yarns having a different construction, and for compounded rubber based either on natural rubber or on synthetic rubber.

EXAMPLE 4

An adhesive-coating bath according to the invention, consisting of a resin solution A containing:

| | |
|---|---|
| softened water | 547 parts by weight |
| sodium hydroxide | 1 parts by weight |
| precondensed resorcinol/formaldehyde resin known by the trade mark "Penacolite B₁A" | 57 parts by weight |
| 40 % strength formaldehyde | 15.5 parts by weight | is prepared whilst stirring at ambient temperature.

A latex solution B, which is left to ripen for 3 to 4 minutes, and a latex solution C, are prepared separately, whilst stirring and at ambient temperature; these solutions respectively contain:

| | |
|---|---|
| latex solution B: | |
| latex based on vinylpyridine | 805 parts by weight |
| polychloroprene | 92 parts by weight |
| 28 % strength ammonium hydroxide | 80 parts by weight |
| latex solution C: | |
| softened water | 200 parts by weight |
| 28 % strength ammonium hydroxide | 15 parts by weight |
| "Pliolite 4121" dicarboxylated/butadiene styrene resin | 350 parts by weight |

Latex solution C is poured into solution B whilst stirring, and solution A is then poured into the mixture thus obtained, whilst stirring at ambient temperature.

| | |
|---|---|
| Solids content of the composition | 30 % |
| Dry weight of resin/solids content | 9.8 % |
| Dry weight of latex/solids content | 86 % |
| Dry weight of latex/dry weight of resin | 8.7/1 |
| Dry weight of chlorinated latex/total of the latices | 10 % |

The bath is left to stand for 24 hours.

The adhesive-coating composition thus obtained, of pH 9.6, has a stable viscosity and a good mechanical stability.

3 cords of glass fibres each of 340 dtex, with each strand having a diameter of 9μ, are impregnated by means of the composition thus prepared.

Each cord is drained on a roller equipped with a wiper blade to remove the excess bath, and is then dried continuously at a speed of 45 m/minute in a 12 meter long oven maintained at 270° C.; the treatment of cross-linking the resin is then carried out continuously in a 12 meter long oven at 270° C. at a speed of 45 m/minute.

Each cord adhesive-coated in this way is twisted at 140 turns/m in the Z-direction and the 3 cords are then twisted together at 140 turns/m in the S-direction.

Apart from very great flexibility, the twisted cord thus prepared has the following characteristics:

| | |
|---|---|
| Adhesion H towards compounded rubber based on polychloroprene, of the composition given above | 8.5 kg/5 mm (mean of 20 measurements) |
| Proportion deposited: 17 % ( $\frac{\text{Adhesive-coated product} - \text{raw product}}{\text{raw product}}$ ) | |
| Breaking load: | 26.4 kg |

EXAMPLE 5

An adhesive-coating composition composed of the following is prepared in the same manner as according to Example 4:

| Solution A | |
|---|---|
| softened water | 732 parts by weight |
| sodium hydroxide | 1 parts by weight |
| "Penacolite B₁A" precondensed resorcinol/formaldehyde resin | 48 parts by weight |
| 40 % strength formaldehyde | 12 parts by weight |
| Solution B | |

-continued

| | | |
|---|---|---|
| latex based on vinylpyridine | 805 | parts by weight |
| polychloroprene | 92 | parts by weight |
| 28 % strength ammonium hydroxide | 80 | parts by weight |
| Solution C | | |
| softened water | 200 | parts by weight |
| 28 % strength ammonium hydroxide | 15 | parts by weight |
| "Pliolite 4121" dicarboxylated/butadiene styrene resin | 350 | parts by weight |
| Solids content of the composition | 27 % | |
| Weight of dry latex/solids content | 87 % | |
| Weight of dry resin/solids content | 8 % | |
| Dry weight of latex/resin | 10.5/1 | |
| Dry weight of chlorinated latex/latex | 10 % | |

The composition is left to stand for 24 hours. It has a pH of 9.6, a viscosity which is stable over a period of time, and good mechanical stability.

3 Cords of 340 dtex (9μ) are treated in exactly the same manner as according to Example 4, the cords being twisted together in this case also.

The final cord has great flexibility and possesses the following characteristics:

| | |
|---|---|
| Adhesion H towards compounded rubber based on polychloroprene | 8.1 kg/5 mm (mean of 20 measurements) (measured as in Ex. 1) |
| Proportion of deposit: 20 % | |
| Adhesion H towards compounded rubber based on natural rubber | 7.5 kg/5mm (mean of 20 measurements) |
| Proportion of deposit: 20.4 %. | |

We claim:

1. New adhesive-coating composition which makes it possible to improve the adhesion of heat-stable, high-modulus, modal, polyester yarns and of glass fibres, to compounded rubbers based either on natural rubber or on synthetic rubber, characterised in that it consists of:

| | |
|---|---|
| a resin solution A containing: | |
| softened water | 547 to 8,954 parts by weight |
| sodium hydroxide | 1 to 2 parts by weight |
| precondensed resorcinol/formaldehyde resin | 48 to 57 parts by weight |
| 40% strength formaldehyde | 14.75 to 17.5 parts by weight |
| a latex solution B containing: | |
| latex based on vinylpyridine | 805 to 875 parts by weight |
| polychloroprene latex | 46 to 92 parts by weight |
| 28% strength ammonium hydroxide | 80 parts by weight |
| a latex solution C containing: | |
| softened water | 200 parts by weight |
| 28% strength ammonium hydroxide | 15 parts by weight |
| dicarboxylated butadiene styrene resin | 350 parts by weight | and in that the proportion by weight of solids relative to the weight of the bath varies between 6 and 30%, the proportion by weight of dry resin relative to the total weight of solids varies from 8% to 10%, the ratio of dry latex to the weight of dry resin varies from 8/1 to 11/1, the proportion by weight of dry chlorinated latex relative to the total weight of dry latex varies from 5 to 10%, the proportion by weight of dry latex relative to the total amount of solids varies from 86 to 87% and the final pH of the composition is 9.6±0.3.

2. Yarns based on heat-stable, high-modulus, modal, polyesters, and glass fibres adhesive-coated by means of the composition according to claim 1.

* * * * *